May 27, 1952     J. C. CARMODY     2,598,505
WIND VANE

Filed Jan. 28, 1947     2 SHEETS—SHEET 1

Inventor:
James C. Carmody,
By W. B. Williamson
Attorney.

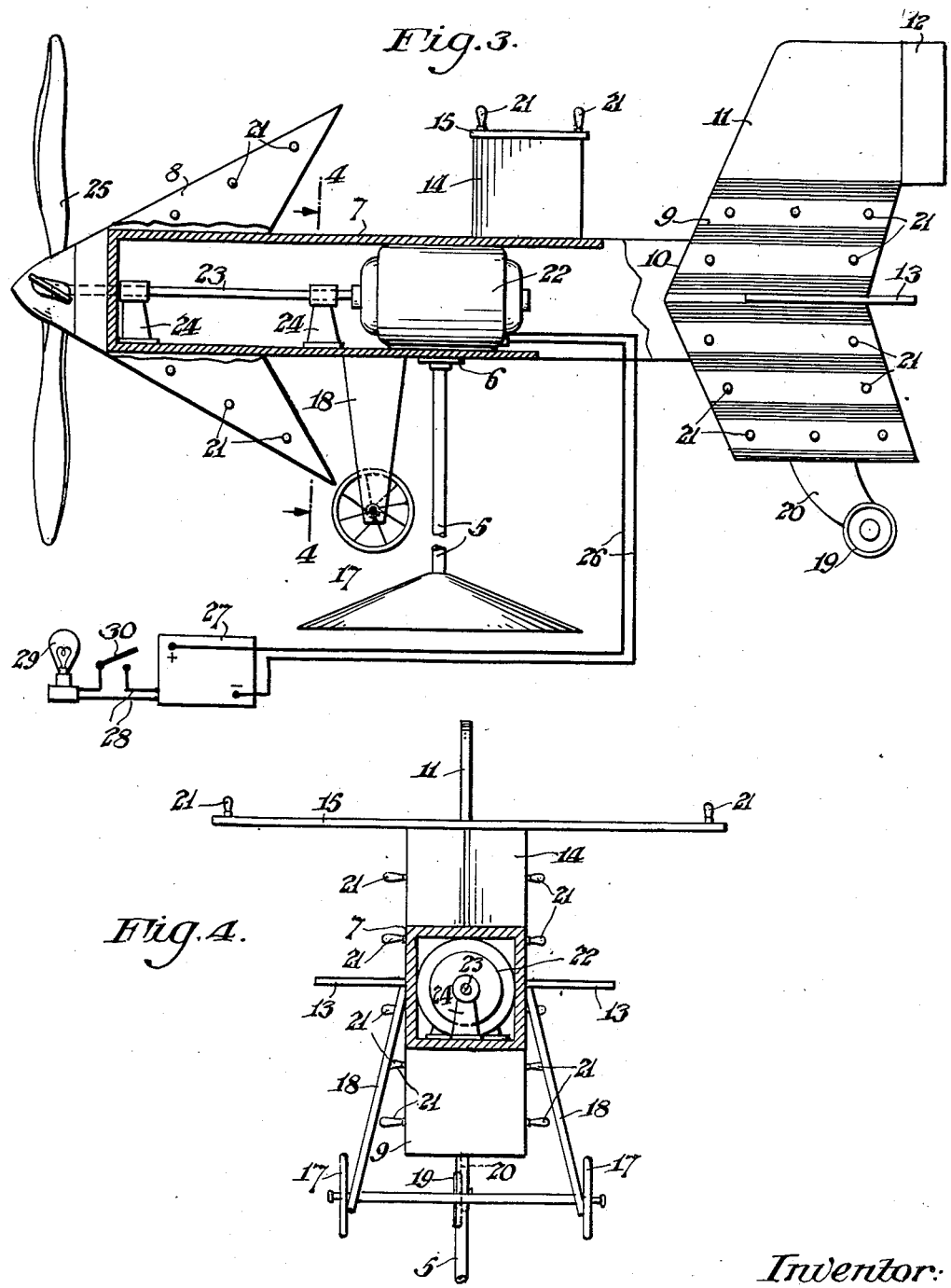

Patented May 27, 1952

2,598,505

UNITED STATES PATENT OFFICE 2,598,505

WIND VANE

James C. Carmody, Philadelphia, Pa.

Application January 28, 1947, Serial No. 724,883

1 Claim. (Cl. 73—188)

My invention relates to new and useful wind vanes and more particularly to devices of this kind for use at airports or the landing fields for airplanes and one that will accomplish the ordinary functions of the usual wind sock as well as act as a field identifying sign.

One of the objects of this invention is to construct a wind vane having the general characteristics of an airplane and an arrow combined to produce a wind direction indicator that will be readily discernable from various locations or angles at reasonable altitudes.

Another object of the invention is to provide a wing surface of sufficient area to carry the designation of the airport, such as the name of the city and state where such airport is located.

Another object of the present invention is to construct a wind vane including a body or fuselage enclosing an electric generator having a shaft projecting from the nose or forward end of the fuselage and on which a propeller is mounted for revolving the shaft when the wind blows, which shaft will operate the generator to provide electricity for lighting lamps on the wind vane and other suitable purposes.

A further object of the invention is to provide means for outlining the general shape of the arrow and parts of the airplane form at night by the use of electric lamps of any desirable type.

A still further object of this invention is to combine a wind vane with an electric generator, storage battery and lamps whereby operation of the wind vane will produce electricity that can be stored for lighting purposes at night or other dark periods.

With the above and other objects in view this invention consists of the details of construction and combination of elements hereinafter set forth and then designated by the claim.

In order that those skilled in the art to which this invention appertains may understand how to make and use the same I will describe its construction in detail referring by numerals to the accompanying drawing forming a part hereof, in which—

Fig. 3 is a sectional side elevation of the same with some electrical apparatus illustrated diagrammatically.

Fig. 4 is a section on the line 4—4 of Fig. 3.

In carrying out my invention as herein embodied 5 represents a suitable upright, post or rod carrying a thrust bearing 6 on which is mounted the wind vane proper, including a representation of an airplane and an arrow combined in one structure. Said wind vane includes a hollow body or fuselage 7 with an arrow head 8 at the forward end and a tail or "feather" 9 at the rear end.

Both the head and tail can be made by fastening blocks of proper configuration on the top and underneath of the body with the sides of the blocks flush with the sides of said body and outlining the continuation of the boundaries of said head and tail on the sides of the body, as at 10. It is particularly desirable that the sides of the tail be stripped and, if advisable, other parts can be done in contrasting colors.

Figure 1:
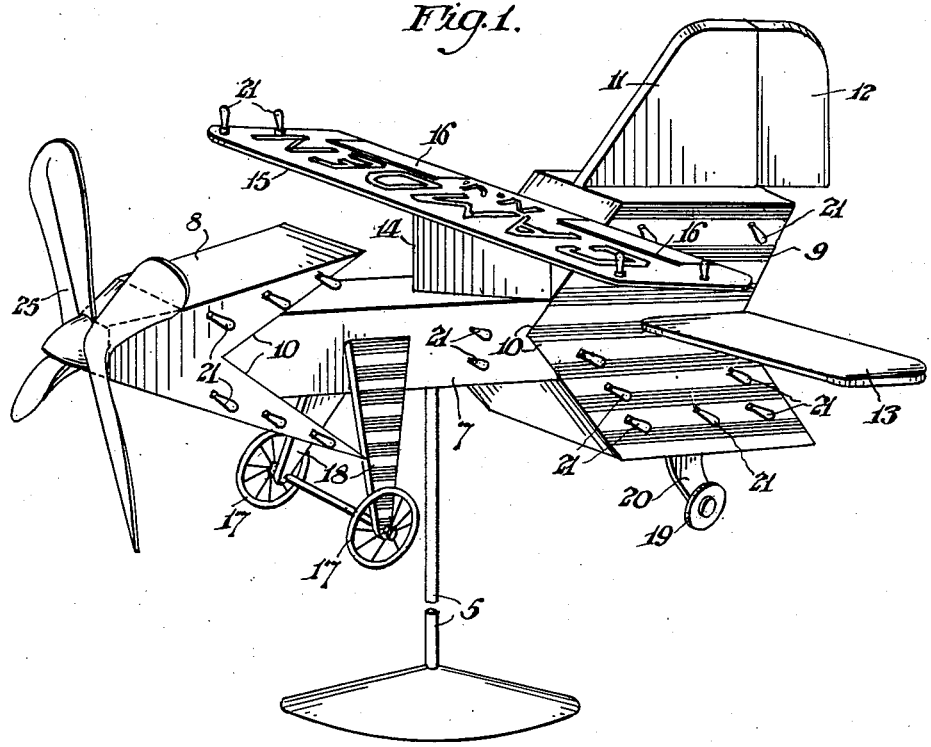
Fig. 1 is a perspective view of a wind vane constructed in accordance with my invention.
Figure 2:
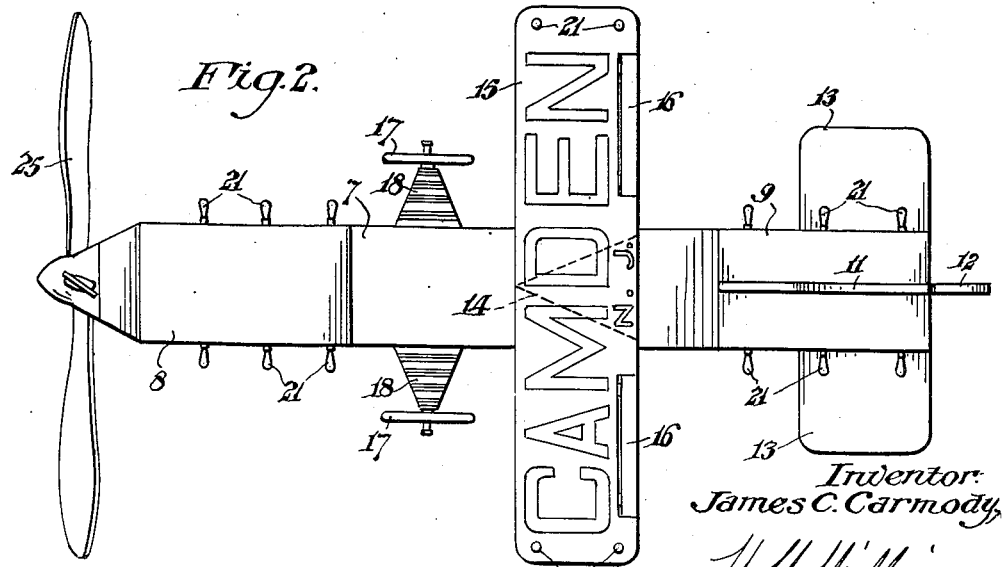
Fig. 2 is a top plan view thereof.

On top of the tail 9 is a relatively thin stabilizer 11 carrying a vertical rudder 12. From each side of the tail projects a panel 13 which, together, represents a horizontal rudder. On top of the body, ahead of the tail, is mounted a wing supporting block 14, triangular in plan, as will be apparent from Fig. 2, with an angle or corner positioned forwardly to reduce wind pressure. A wing panel 15 is fixed on the supporting block 14 and may have the name of an airfield or a city and state delineated thereon. Said wing preferably has ailerons 16 hinged or otherwise suitably attached to the rear edge thereof.

The main landing wheels 17 are mounted on struts or hangers 18 carried by the sides of the body or fuselage and depending divergently therefrom while the rear wheel or castor 19 is attached to a single hanger 20 mounted on the underside of the tail 9.

The sides of the body or fuselage, arrow head and tail, and the wing may be outlined with lamps 21, such as incandescent bulbs or gas or vapor tubes, supplied with electricity from a suitable source, one of which will be hereinafter described.

Within the hollow body or fuselage 7 is fixedly mounted an electric generator 22 in the center of gravity of the complete apparatus and functions as the primary source of supply. From said generator projects a shaft 23 which extends through the nose of the arrow head and said shaft is supported by suitable bearings 24. On the outer end of said shaft is mounted a propeller 25, the hub of which may be fashioned to form the actual point of the arrow head. The blades of this propeller are preferably spoon shaped, that is, the blades are dished like the bowl of a spoon in order to increase the pressure on the propeller for revolving the same.

Conductors 26 lead from the generator to any desirable instrumentalities, as the aforementioned lamps, or a secondary source of supply such, for example, a storage battery 27, or multiples thereof. The electrical parts are illustrated diagrammatically but it is to be understood that the conductors may be in a cable passing through the post 5 and underground to the location of the battery installed in a suitable building. From the battery may lead conductors 28 to field or other lamps represented by the lamp 29. A switch 30 is interposed between the battery and lamp. If preferred, other conductors (not shown) may lead from the battery to the lamps on the wind vane proper.

From the foregoing it will be apparent that because of the resemblance of the apparatus to an airplane, it will function as an indicator to aviators of the presence of a landing field and where the name of the field is shown on the wing, the exact location of an aviator's position in flight will be known. If a landing is to be made, the direction of the wind will be readily ascertainable by merely viewing the arrow shaped portion of the vane. Further the speed of the propeller will indicate whether the wind is blowing at a high or low velocity. During the night or dark periods the same results occur because of the particular arrangement of the illuminating means. Also, because the generator is combined with the other features, the cost of lighting will be exceedingly low.

Of course I do not wish to be limited to the exact details of construction herein shown and described, as these may be varied within the scope of the appended claim without departing from the spirit of my invention.

Having described my invention, what I claim as new and useful is:

A wind vane to appear as an airplane when viewed from above and as an arrow when viewed from the side and consisting of a hollow body representing the fuselage of an airplane and the shaft of an arrow, an arrow head mounted on the forward end of said body with the barbs of said head in a vertical plane, an arrow tail at the rear end of said body with the broadsides in vertical planes, a wing panel mounted in a horizontal plane on top of said body crosswise thereof intermediate the ends of said body to represent the wings of an airplane, a stabilizer member mounted on the upper edge of the arrow tail and projecting upwardly in the same vertical plane as said arrow tail, a vertical rudder attached to the rear edge of the stabilizer member and in the same plane as said stabilizer member, horizontal rudder panels projecting from the sides of said arrow tail in substantially horizontal planes, a shaft journalled in the body and projecting from the point or nose of the arrow head, a propeller mounted on the projecting end of said shaft and appearing as an airplane prop, a generator within the body and connected to the shaft, electric lamps mounted on top of and outlining the wing panel, other electric lamps mounted on the sides of and outlining the arrow head and tail, and an electric circuit including said generator and electric lamps.

JAMES C. CARMODY.

REFERENCES CITED

The following references are of record in the file of this patent:

UNITED STATES PATENTS

| Number | Name | Date |
| --- | --- | --- |
| 1,305,803 | Irvin | June 3, 1919 |
| 1,467,336 | Rumfelt | Sept. 11, 1925 |
| 1,644,547 | Smith | Oct. 4, 1927 |
| 1,666,361 | Thompson | Apr. 17, 1928 |
| 2,017,224 | Wilhelm | Oct. 15, 1935 |